(12) United States Patent
Nakao et al.

(10) Patent No.: US 8,817,767 B2
(45) Date of Patent: *Aug. 26, 2014

(54) METHOD AND APPARATUS FOR TRANSMITTING SIGNALS

(75) Inventors: Seigo Nakao, Gifu (JP); Yasuhiro Tanaka, Ichinomiya (JP); Nobuo Higashida, Moriguchi (JP)

(73) Assignee: Hera Wireless S.A., Luxembourg (LU)

( * ) Notice: Subject to any disclaimer, the term of this patent is extended or adjusted under 35 U.S.C. 154(b) by 99 days.

This patent is subject to a terminal disclaimer.

(21) Appl. No.: 13/566,184

(22) Filed: Aug. 3, 2012

(65) Prior Publication Data

US 2013/0022159 A1     Jan. 24, 2013

Related U.S. Application Data

(63) Continuation of application No. 11/167,585, filed on Jun. 28, 2005, now Pat. No. 8,265,055.

(30) Foreign Application Priority Data

Jun. 28, 2004   (JP) .................................. 2004-189303
Jun. 21, 2005   (JP) .................................. 2005-180551

(51) Int. Cl.
    *H04J 1/00*      (2006.01)

(52) U.S. Cl.
USPC ........... 370/343; 370/344; 370/338; 370/331; 370/328; 370/334; 370/349; 455/522; 455/562.1

(58) Field of Classification Search
CPC ...... H04W 52/04; H04W 52/38; H04W 52/58
USPC .......... 370/328, 331, 334, 343, 349; 455/522, 455/562 A
See application file for complete search history.

(56) References Cited

U.S. PATENT DOCUMENTS 8,265,055 B2 *   9/2012   Nakao et al. ................. 370/343

* cited by examiner

*Primary Examiner* — Amancio Gonzalez
(74) *Attorney, Agent, or Firm* — DC Patent Lawyers, PLLC

(57) ABSTRACT

A storage unit stores a preamble signal defined in a legacy system and a preamble signal defined in a MIMO system. A monitoring unit in a transmitting apparatus monitors the existence of any communication apparatus which is not compatible with the MIMO system but accepts the legacy system. A channel characteristics acquiring unit derives the characteristics of a radio channel between the transmitting apparatus and a receiving apparatus. A selector selects a packet format based on a monitoring result obtained by the monitoring unit. The selector also selects where to place LTS, based on the characteristics of wireless channel derived by the channel characteristics acquiring unit.

1 Claim, 14 Drawing Sheets

| LEGACY STS | LEGACY LTS | SIGNAL | STS 1 | LTS 1 | SIGNAL | DATA 1 |
|---|---|---|---|---|---|---|
| | | | STS a | LTS a | SIGNAL | DATA 2 |

FIG.8

|  | 1ST TRANSMITTING ANTENNA 14a | 2ND TRANSMITTING ANTENNA 14b | 3RD TRANSMITTING ANTENNA 14c |
|---|---|---|---|
| THE NUMBER OF ANTENNAS:1 | LEGACY STS OR STS 1 | — | — |
| THE NUMBER OF ANTENNAS:2 | STS 1 | STS a | — |
| THE NUMBER OF ANTENNAS:3 | STS 1 | STS 2 | STS b |

METHOD AND APPARATUS FOR TRANSMITTING SIGNALS

This application is a continuation application of application Ser. No. 11/167,585, filed on Jun. 28, 2005, which is based upon and claims priority based on 35 USC 119 from prior Japanese Patent Application No. P2004-189303 filed on Jun. 28, 2004 and P2005-180551 filed on Jun. 21, 2005; the entire contents of which are incorporated herein by reference.

BACKGROUND OF THE INVENTION

1. Field of the Invention

The present invention relates to the signal transmission technologies, and it particularly relates to method and apparatus for transmitting signals in the packet format.

2. Description of the Related Art

In wireless communication, it is generally desired that the limited frequency resources be used effectively. Adaptive array antenna technology is one of the technologies that realize the effective utilization of frequency resources. In adaptive array antenna technology, the amplitude and phase of signals transmitted from and received by a plurality of antennas, respectively, are so controlled as to form a directional pattern of the antenna. In other words, the apparatuses provided with adaptive array antennas change respectively the amplitudes and phases of signals received by a plurality of antennas, add up the thus changed received signals, and receive signals equivalent to the signals received by the antenna having the directional pattern corresponding to the variation in said amplitude and phase (hereinafter referred to as "weight"). And the signals are transmitted in a directional pattern of the antenna corresponding to the weight.

One example of processings to compute the weights in adaptive array antenna technology is a processing based on the MMSE (Minimum Mean Square Error) method. In the MMSE method, the Wiener solution is known to be the condition for an optimum weight value. Also known is a recurrence formula whose amount of calculation is smaller than that required to directly solve the Wiener solution. For such recurrence formula, adaptive algorithms, such as RLS (Recursive Least Squares) algorithm and LMS (Least Mean Squares) algorithm, are used. On the other hand, for the purpose of realizing a higher data transmission rate and improving the transmission quality, there is a case where data are subjected to multi-carrier modulation and the multi-carrier signals are transmitted (See Reference (1) in the following Related Art List, for instance).

RELATED ART LIST (1) Japanese Patent Application Laid-Open No. Hei10-210099.

There is a MIMO (Multiple Input Multiple Output) system as one of technologies by which to raise the transmission rate of data using the adaptive array antenna technology. A transmitting apparatus and a receiving apparatus in the MIMO system are each equipped with a plurality of antennas, and a channel suitable for each of the antennas is set. That is, the channel of up to the maximum number of antennas is set for the communication between the transmitting apparatus and the receiving apparatus, so as to improve the data transmission rate. Moreover, combining the MIMO system with a technique of transmitting multi-carrier signals results in a higher data transmission rate. On the other hand, the transmitted signals generally contain preambles that are known signals in order for the signals transmitted from the transmitting apparatus to be accurately received. In general, a preamble signal is specified by a fixed pattern. Nevertheless, if the pattern of a preamble signal varies taking into account the characteristics of radio channel and the packet utilization efficiency, it is possible to realize a wireless communication system which is flexible in terms of the characteristics of radio channel and the like.

SUMMARY OF THE INVENTION

The present invention has been made in view of the foregoing circumstances and problems, and an object thereof is to provide method and apparatus by which to vary the format of preamble signal.

In order to solve the above problems, a transmitting apparatus according to a preferred mode of carrying out the present invention comprises: a storage unit which stores a first known signal defined in a first wireless communication system and a second known signal defined in a second wireless communication system which differs from the first wireless communication system; a selector which selects either a first packet format in which the second known signal is placed in a front portion thereof or a second packet format in which the first known signal is further placed before the second known signal; and a transmitter which transmits signals in the packet format selected by the selector.

According to this mode of carrying out the present invention, the presence or absence of the first preamble signal is switched, so that the improvement in the compatibility with the first wireless communication system and the packet utilization efficiency in the second wireless communication system can be selected.

Another preferred mode of carrying out the present invention relates also to a transmitting apparatus. This apparatus comprises: a storage unit which stores a first known signal defined in a first wireless communication system which is to transmit signals using a plurality of carriers and a second known signal defined in a second wireless communication system which is to transmit signals from a plurality of antennas in parallel, using the same number of carriers to transmit the signals as in the first wireless communication system; a selector which selects either a first packet format in which the second known signal is placed in a front portion thereof, or a second packet format in which the first known signal is further placed before the second known signal; and a transmitter which transmits signals in the packet format selected by the selector.

According to this mode of carrying out the present invention, the presence or absence of the first preamble signal is switched, so that the improvement in the compatibility with the first wireless communication system and the packet utilization efficiency in the second wireless communication system can be selected.

The second known signal stored in the storage unit may be defined in a plurality of kinds in accordance with the number of antennas which are to transmit signals in the second wireless communication system. Since the pattern of the second known signal is changed in accordance with the number of antennas, the communication quality can be improved.

If the packet format in which the second known signal is placed in a front portion thereof is selected and the number of antennas to transmit signals is one, the selector may assign one of the second known signals in which the plurality of kinds are defined. Even if the number of antennas becomes one from a plural number, the second known signal corresponding to one of a plurality of antennas is used. Thus, the switching to the first wireless communication system is no longer necessary.

When the second packet format in which the first known signal is further placed before the second known signal is selected, the selector may assign information indicating that the second known signal is placed, between the first known signal and the second known signal. Since the information indicating that the second known signal has been placed after the first known signal is inserted, the content of such a subsequent signal can be conveyed to a communication apparatus of the first wireless communication system.

The transmitting apparatus may further comprise a monitoring unit which monitors the presence of a communication apparatus which is not compatible with the second wireless communication system and is compatible with the first wireless communication system, wherein the selector may select a packet format based on a monitoring result obtained from the monitoring unit. The switching between the presence and the absence of the first known signal is done based on whether any terminal apparatus of the first wireless communication system exits or not. Hence, no adverse effect will be given on other communication apparatus even if the switching is carried out.

Still another preferred mode of carrying out the present invention relates'also to a transmitting apparatus. This apparatus comprises: a transmitter which transmits signals defined in a predetermined packet format, in parallel from a plurality of antennas; storage unit which stores a known signal to be placed in a front portion of a packet format; and a selector which selects, at the time of placing a known signal in the front portion of a packet format, either a first assignment in which the known signal is transmitted at the same timing from the plurality of antennas or a second assignment in which the known signal is transmitted at different timings from the plurality of antennas.

According to this mode of carrying out the present invention, the assignment of a preamble signal to be transmitted from a plurality of antennas is varied. Thus, the transmission quality of signals and the packet utilization efficiency can be selected.

The transmitting apparatus may further comprise a derivation unit which derives characteristics of a radio channel through which signals are to be transmitted, wherein the selector may select the assignment of known signal based on the characteristics of a radio channel derived by the derivation unit. The structure of preamble signals to be transmitted from a plurality of antennas is varied based on the quality of a radio channel, so that the structure of a preamble suitable for the radio channel in use can be selected.

Still another preferred mode of carrying out the present invention relates to a transmitting method. This method is characterized in that a first known signal defined in a first wireless communication system which is to transmit signals using a plurality carriers is specified, a second known signal defined in a second wireless communication system which is to transmit signals in parallel from a plurality of antennas using the same number of carries as the number of carries through which to transmit the signals are specified, and the signals are transmitted by selecting either a first packet format in which the second known signal is placed in a front portion or a second packet format in which the first known signal is further placed before the second known signal.

Still another preferred mode of carrying out the present invention relates also to a transmitting method. This method comprises: storing a first known signal defined in a first wireless communication system and a second known signal defined in a second wireless communication system which differs from the first wireless communication system; selecting either a first packet format in which the second known signal is placed in a front portion thereof or a second packet format in which the first known signal is further placed before the second known signal; and transmitting signals in the packet format selected by the selecting.

Still another preferred mode of carrying out the present invention relates also to a transmitting method. This method comprises: storing a first known signal defined in a first wireless communication system which is to transmit signals using a plurality of carriers and a second known signal defined in a second wireless communication system which is to transmit signals from a plurality of antennas in parallel, using the same number of carriers to transmit the signals as in the first wireless communication system; selecting either a first packet format in which the second known signal is placed in a front portion thereof, or a second packet format in which the first known signal is further placed before the second known signal; and transmitting signals in the packet format selected by the selecting.

The second known signal stored in the storing may be defined in a plurality of kinds in accordance with the number of antennas which are to transmit signals in the second wireless communication system. If the packet format in which the second known signal is placed in a front portion thereof is selected and the number of antennas to transmit signals is one, the selecting may assign one of the second known signals in which the plurality of kinds are defined. When the second packet format in which the first known signal is further placed before the second known signal is selected, selecting may assign information indicating that the second known signal is placed, between the first known signal and the second known signal.

The transmitting method may further comprise monitoring the presence of a communication apparatus which is not compatible with the second wireless communication system and is compatible with the first wireless communication system, wherein the selecting may select a packet format based on a monitoring result obtained in the monitoring. The second signal stored in the storing may have a plurality of portions whose signal patterns differ from each other, and the selecting may select either a first assignment of the second known signal in which at least one of the plurality of portions are transmitted respectively at the same timing from a plurality of antennas or a second assignment of the second known signal in which at least one of the plurality of portions are transmitted respectively at different timings from the plurality of antennas. The method may further comprise deriving characteristics of a radio channel through which signals are to be transmitted, wherein the selecting may select the assignment of known signal based on the characteristics of a radio channel derived by the deriving.

Still another preferred mode of carrying out the present invention relates also to a transmitting method. This method is such that either a first assignment in which a known signal is transmitted at the same timing from a plurality of antennas or a second assignment in which the known signal is transmitted at different timings from the plurality of antennas is selected for the known signal to be placed in a front portion of a packet format of signal to be transmitted in parallel from the plurality of antennas.

Still another preferred mode of carrying out the present invention relates also to a transmitting method. This method comprises: transmitting signals defined in a predetermined packet format, in parallel from a plurality of antennas; storing a known signal to be placed in a front portion of a packet format; and selecting, at the time of placing a known signal in the front portion of a packet format, either a first assignment in which the known signal is transmitted at the same timing from the plurality of antennas or a second assignment in which the known signal is transmitted at different timings from the plurality of antennas. The method may further comprise deriving characteristics of a radio channel through which signals are to be transmitted, wherein the selecting may select the assignment of known signal based on the characteristics of a radio channel derived by the deriving.

It is to be noted that any arbitrary combination of the above-described structural components and expressions of the present invention changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 8 is a table showing a relationship, used when the selection is done at the selector shown in FIG. 5, between the number of transmitting antennas and the patterns of STSs transmitted by the transmitting antennas.

DETAILED DESCRIPTION OF THE INVENTION

Figure 1:
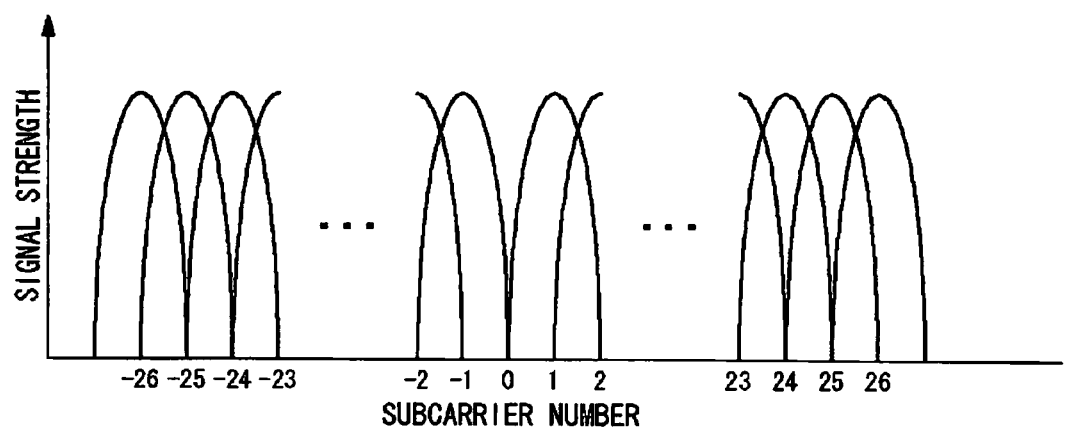
FIG. 1 illustrates a spectrum of a multi-carrier signal according to the present embodiment.

The invention will now be described based on the following embodiments which do not intend to limit the scope of the present invention but exemplify the invention. All of the features and the combinations thereof described in the embodiments are not necessarily essential to the invention.

Before describing the present invention in detail, an outline of the present invention will be described first. The present embodiment relates to a MIMO system which comprises a transmitting apparatus equipped with a plurality of antennas and a receiving apparatus equipped with a plurality of antennas. The MIMO system according to the present embodiment transmits signals by multi-carriers, or more specifically OFDM (Orthogonal Frequency Division Multiplexing) modulation scheme, and the transmitted signals are defined and specified in the packet format. A preamble signal is placed at a front portion of a packet format. And a receiving apparatus, which has received a signal, carries out the setting of AGC (Automatic Gain Control), the synchronization of timing, the recovery of carriers and the like, based on the preamble signal. In the MIMO system, independent signals are transmitted from a plurality of antennas of a transmitting apparatus and a receiving apparatus demodulates desired signals by separating received signals by adaptive array signal processing.

On the other hand, there are cases where in the vicinity of a transmitting apparatus there exists a receiving apparatus which is not compatible with a MIMO system (hereinafter, a system not compatible with a MIMO system will be referred to as "legacy system"). Although the legacy system transmits signals by the OFDM modulation scheme the same way as the MIMO system does, it differs from the MIMO system in that the signals are transmitted by setting one channel between the transmitting apparatus and the receiving apparatus. Now, if a preamble signal compatible with the MIMO system only is added, the signal redundancy in the packet format in the MIMO system can be reduced. However, since the legacy system cannot recognize such a preamble signal, there are cases where the arrival of signals cannot be recognized. This corresponds to the carrier sense being not accurately executed if the legacy system uses CSMA (Carrier Sense Multiple Access). Thus, since the legacy system judges in this case that the signals are not transmitted and, for that reason, mistakenly transmits the signals by itself, the rate of occurrence of signal collision increases.

In contrast thereto, if a preamble signal compatible with the legacy system is added before the preamble signal compatible with the MIMO system only, the legacy system can also recognize the preamble signal, thus making it hard to cause the above-described problem. Nevertheless, since the preambles compatible with both the two systems are added in this case, the signal redundancy in the packet format in the MIMO system increases. Hence, a transmitting apparatus according to the present embodiment is such that a preamble signal compatible with a legacy system is added to the front portion of a packet format if a receiving apparatus compatible with the legacy system exists in the vicinity of the transmitting apparatus whereas the preamble signal compatible with the legacy system is not added to the front portion of a packet format if the receiving apparatus compatible with the legacy system does not exist in the vicinity of the transmitting apparatus. It is to be noted here that the "front portion" represents a part of leading portion, located near the head of a packet format, which also includes the head thereof.

FIG. 1 illustrates a spectrum of a multi-carrier signal according to the present embodiment. This corresponds to a multi-carrier signal transmitted from the legacy system and a multi-carrier signal transmitted from one of a plurality of antennas in the MIMO system. Here, assume that the legacy system is a wireless LAN (Local Area Network) conforming to the IEEE802.11a standard (hereinafter, a wireless LAN system in compliance with IEEE802.11a standard will be referred to as "legacy system", too). One of a plurality of carriers in an OFDM scheme is generally called a subcarrier. Herein, however, each of the subcarriers is designated by a "subcarrier number". As illustrated in FIG. 1, the IEEE802.11a standard defines 53 subcarriers, namely, subcarrier numbers "–26" to "26". It is to be noted that the subcarrier number "0" is set to null so as to reduce the effect of a direct current component in a baseband signal. Also, the respective subcarriers are modulated by BPSK (Binary Phase Shift Keying), QSPK (Quadrature Phase shift Keying), 16QAM (Quadrature Amplitude Modulation) and 64QAM.

Figure 2:
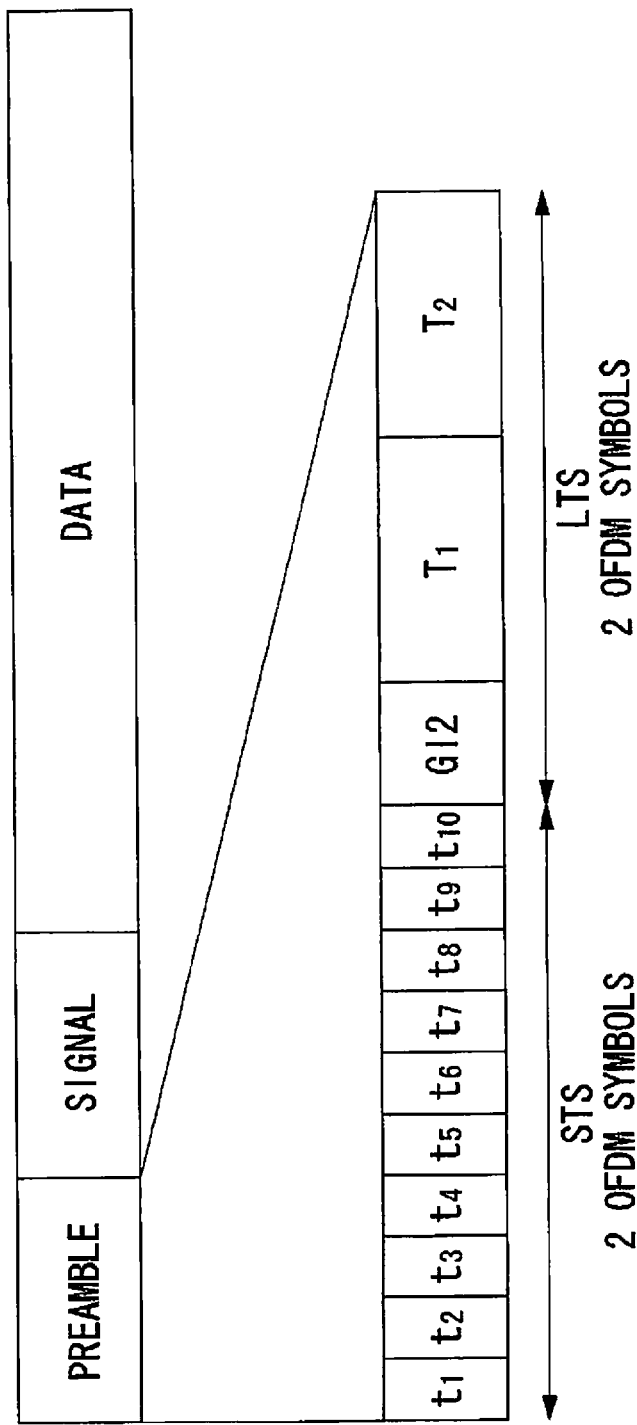
FIG. 2 illustrates a structure of a packet format according to the present embodiment.

FIG. 2 shows a structure of a packet format according to the present embodiment. This corresponds to a traffic channel of a legacy system. In the OFDM modulation scheme, the total sum of the size of Fourier transform and the number of symbols of a guard interval generally constitutes one unit. This "one unit" is called an OFDM symbol in the present embodiment. In the legacy system, the size of Fourier transform is 64 (hereinafter the points of one FFT (Fast Fourier Transform) will be called "FFT point") and the FFT point number of a guard interval is 16, so that the OFDM symbol corresponds to 80 FFT points.

A packet signal is such that a "preamble" composed of "4 OFDM symbols" is placed in the leading portion of the packet signal and a "signal" of "1 OFDM symbol" and "data" of arbitrary length in this order are placed subsequent to the "preamble". The "preamble" is a known signal used for the setting of AGC, timing synchronization and carrier recovery and the like in a receiving apparatus. The "signal" is a control signal whereas the "data" is information to be transmitted from a transmitting apparatus to a receiving apparatus. As shown in FIG. 2, the "preamble" composed of "4 OFDM symbols" are separated into "STS (Short Training Sequence)" composed of "2 OFDM symbols" and "LTS (Long Training Sequence)" composed of "2 OFDM symbols". STS is constituted by ten signal units "$t_1$" to "$t_{10}$" and each signal unit, such as "$t_1$", is equal to 16 FFT points. Though STS is 16 FFT points in time-domain unit as described above, it uses, in frequency domain, 12 subcarriers among 53 subcarriers as shown in FIG. 1. STS is used particularly for the setting of AGC and the timing synchronization. LTS, on the other hand, is constituted by two signal units "$T_1$" and "$T_2$" and a guard interval "GI2" which is twice as long as "$t_1$". And one signal unit such as "$T_1$" is 64 FFT points whereas "GI2" is 32 FFT points. LTS is used particularly for the carrier recovery.

A signal in the frequency domain as shown in FIG. 1 is expressed by $S_{-26, 26}$, where the subscript indicates the subcarrier number. Using such notation as this, STS of legacy system is expressed as in the following Equation (1).

$$S_{-26,26} = \text{sqrt}(13/6)\{0,0,1+j,0,0,0,-1-j,0,0,0,1+j,0,0,0,-1-j,0,0,0,-1-j,0,0,0,1+j,0,0,0,0,0,0,-1-j,0,0, 0,-1-j,0,0,0,1+j,0,0,0,1+j, 0,0,0,1+j,0,0,0,1+j,0, 0\} \quad (1)$$

where "1+j" denotes the signal point of STS after a QPSK modulation.

Figure 3:
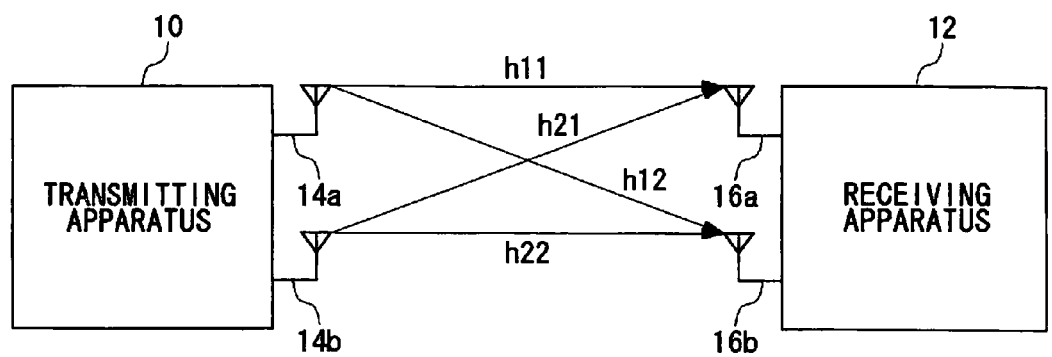
FIG. 3 illustrates a concept of a communication system according to the present embodiment.

FIG. 3 illustrates a concept of a communication system 100 according to the present embodiment. The communication system 100 includes a transmitting apparatus 10 and a receiving apparatus 12. The transmitting apparatus 10 includes a first transmitting antenna 14a and a second transmitting antenna 14b, which are generically called transmitting antennas 14, and the receiving apparatus 12 includes a first receiving antenna 16a and a second receiving antenna 16b, which are generically called receiving antennas 16.

The transmitting apparatus 10 transmits predetermined signals, whereas the first transmitting antenna 14a and the second transmitting antenna 14b transmit different signals. The receiving apparatus 12 receives the signals transmitted from the first transmitting antenna 14a and the second transmitting antenna 14b by the first receiving antenna 16a and the second receiving antenna 16b. The receiving apparatus 12 separates received signals by adaptive array signal processing and demodulates the signals transmitted from the first transmitting antenna 14a and the second transmitting antenna 14b independently. Here, if the channel characteristic between the first transmitting antenna 14a and the first receiving antenna 16a is denoted by $h_{11}$, that between the first transmitting antenna 14a and the second receiving antenna 16b by $h_{12}$, that between the second transmitting antenna 14b and the first receiving antenna 16a by $h_{21}$, and that between the second transmitting antenna 14b and the second receiving antenna 16b by $h_{22}$, then the receiving apparatus 12 operates in such a manner as to activate $h_{11}$ and $h_{22}$ only by an adaptive array signal processing and demodulate the signals transmitted from the first transmitting antenna 14a and the second transmitting antenna 14b independently.

Now, problems to be solved when a preamble signal of a legacy system, for example, the STS thereof is transmitted from each of the first transmitting antenna 14a and the second transmitting antenna 14b shown in FIG. 3 will be explained. If the signal transmitted from the first transmitting antenna 14a is $S_1(t)$, the signal transmitted from the second transmitting antenna 14b is $S_2(t)$, and the noise is $n_1(t)$ and $n_2(t)$, then $X_1(t)$, or the signal received by the first receiving antenna 16a, and $X_2(t)$, or the signal received by the second receiving antenna 16b, will be expressed respectively as:

$$X_1(t) = h_{11}S_1(t) + h_{21}S_2(t) + n_1(t)$$
$$X_2(t) = h_{12}S_1(t) + h_{22}S_2(t) + n_2(t) \quad (2)$$

The signal strength in 16 FFT of signals received by the first receiving antenna 16a is expressed as follows:

$$\begin{aligned}\sum |X_1(t)|^2 &= \sum X_1(t)X_1^*(t) \\ &= \sum \{h_{11}S_1(t) + h_{21}S_2(t) + n_1(t)\} \\ &\quad \{h_{11}^*S_1^*(t) + h_{21}^*S_2^*(t) + n_1^*(t)\} \\ &= h_{11}h_{11}^*\sum S_1(t)S_1^*(t) + h_{21}h_{21}^*\sum S_2(t)S_2^*(t) + \\ &\quad h_{11}h_{21}^*\sum S_1(t)S_2^*(t) + h_{11}^*h_{21}\sum S_1^*(t)S_2(t) + \\ &\quad h_{11}\sum S_1(t)n_1^*(t) + h_{21}\sum S_2(t)n_1^*(t) + \\ &\quad h_{11}^*\sum S_1^*(t)n_1(t) + h_{21}^*\sum S_2^*(t)n_1(t) + \\ &\quad \sum n_1(t)n_1^*(t)\end{aligned} \quad (3)$$

Using the relations $$\sum S_1^*(t)S_2(t) = Xc, \quad \sum S_i^*(t)n_j(t) = 0$$

and $|n_j(t)|^2 \approx 0$, the strength is expressed by:

$$\begin{aligned}\sum |X_1(t)|^2 &= |h_{11}|^2 + |h_{21}|^2 + h_{11}h_{21}^*Xc^* + h_{11}^*h_{21}Xc \\ &= |h_{11}|^2 + |h_{21}|^2 + 2\text{Re}[h_{11}h_{21}^*Xc^*]\end{aligned} \quad (4)$$

When the transmitted signal $S_1(t)$ and $S_2(t)$ are equal to each other and in addition $h_{11} = -h_{21}$, the strength of received signals is zero, so that the AGC of the receiving apparatus 12 does not function accurately. Since Xc in the data interval becomes generally so small as can be regarded as zero, the received power in the data interval becomes $|h_{11}|^2 + |h_{22}|^2$. Hence, the difference in received power between the data interval and the STS interval is $2\text{Re}[h_{11}h_{21}^*Xc^*]$ as expressed by the third term on the right-hand side of Equation (4). This indicates that the AGC does not function normally if the Xc in the STS interval is large and consequently there is a large difference in power between the STS interval and the data interval. Therefore, an STS different from the STS of legacy system is required for the MIMO system and the cross-correlation value between them is desired to be low.

Next, explained is a problem caused when a preamble signal, such as STS, suitable for a MIMO system described above is added to a front portion of a packet format. If a packet signal in which the preamble signal suitable for the MIMO system is added is transmitted, the receiving apparatus 12 can receive said packet signal. On the other hand, a receiving apparatus in the legacy system (not shown) also receives said packet signal suitable for the MIMO system. However, the preamble signals at the legacy system which are stored in the receiving apparatus thereof differ from the preamble signal added to the packet signal. Thus, even if a correlation processing is carried out between them, correlation values will not be greater than a predetermined value. As a result, the receiving apparatus cannot detect the packet signal. If the receiving apparatus and the transmitting apparatus are integrally structured to form a communication apparatus, the aforementioned operation corresponds to the packet signal not being detected by the communication apparatus, so that the transmitting apparatus transmits signals. This means that the carrier sensing is not accurately performed in the communication apparatus, so that the signal collision is likely to occur.

Figure 4:
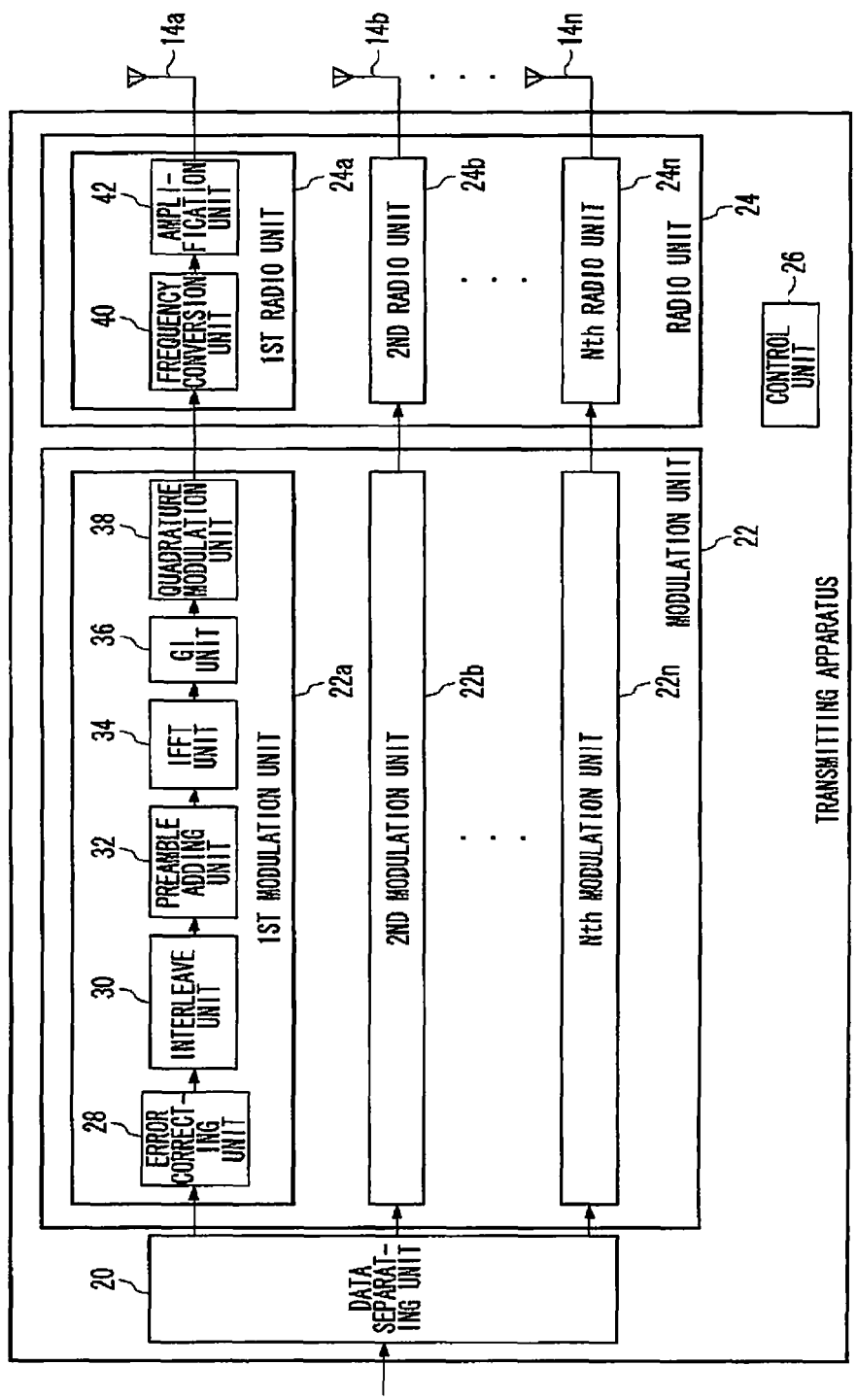
FIG. 4 illustrates a structure of the transmitting apparatus shown in FIG. 3.

FIG. 4 illustrates a structure of a transmitting apparatus 10. The transmitting apparatus 10 includes a data separating unit 20, a first modulation unit 22a, a second modulation unit 22b, . . . and an Nth modulation unit 22n, which are generically referred to as modulation units 22, a first radio unit 24a, a second radio unit 24b, . . . and an Nth radio unit 24n, which are generically referred to as radio units 24, a control unit 26, and a first transmitting antenna 14a, a second transmitting antenna 14b, . . . and an Nth transmitting antenna 14n, which are generically referred to as transmitting antennas 14. The first modulation unit 22a includes an error correcting unit 28, an interleave unit 30, a preamble adding unit 32, an IFFT unit 34, a GI unit 36 and a quadrature modulation unit 38. The first radio unit 24a includes a frequency conversion unit 40 and an amplification unit 42.

The data separating unit 20 separates data to be transmitted, based on the number of antennas. The error correcting unit 28 performs a coding for error correction on data. The coding to be employed here is a convolutional coding, and the coding rate is to be selected from prescribed values. The interleave unit 30 interleaves data after the convolutional coding. The preamble adding unit 32 adds a preamble signal to the front portion of a packet signal. Here, the preamble signals that the preamble adding unit 32 add are specified for a plurality of kinds. And any of such preamble signals of a plurality of kinds is selected based on an instruction from the control unit 26, details of which will be described later.

The IFFT unit 34 performs IFFT (Inverse Fast Fourier Transform) in units of FFT point, thereby converting a frequency-domain signal using a plurality of subcarriers into a signal in time domain. The GI unit 36 adds a guard interval to time-domain data. As illustrated in FIG. 2, the guard intervals to be added to the preamble signal and the data signal are different from each other. The quadrature modulation unit 38 carries out quadrature modulation. The frequency conversion unit 40 performs a frequency conversion by transforming a quadrature-modulated signal into a radio-frequency signal. The amplification unit 42 is a power amplifier for amplifying radio-frequency signals. Finally, signals are transmitted in parallel from a plurality of transmitting antennas 14. It is to be noted that in the present embodiment the transmitting antennas 14 are non-directional and the transmitting apparatus 10 does not perform adaptive array signal processing. The control unit 26 controls the timing and other functions of the transmitting apparatus 10, and selects a preamble signal which is to be added by the preamble adding unit 32.

In terms of hardware, the above-described structure can be realized by a CPU, a memory and other LSIs of an arbitrary computer. In terms of software, it is realized by memory-loaded programs which have a reserved management function or the like, but drawn and described herein are function blocks that are realized in cooperation with those. Thus, it is understood by those skilled in the art that these function blocks can be realized in a variety of forms such as by hardware only, software only or the combination thereof.

Figure 5:
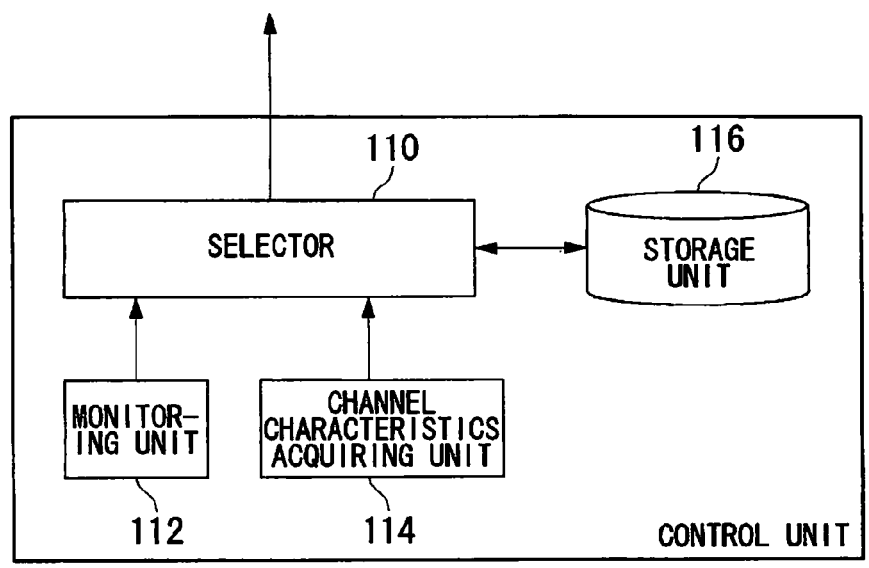
FIG. 5 illustrates a structure of the control unit shown in FIG. 4.

FIG. 5 illustrates a structure of a control unit 26. The control unit 26 includes a selector 110, a monitoring unit 112, a channel characteristics acquiring unit 114 and a storage unit 116.

The storage unit 116 stores preamble signals defined in a legacy system and those defined in a MIMO system. As described earlier, the legacy system transmits signals using a plurality of subcarriers whereas the MIMO system transmits signals in parallel from a plurality of transmitting antennas 14 using the same subcarrier number as that of the legacy system. The preamble signal defined in the MIMO system is specified in a plurality of kinds in accordance with the number of transmitting antennas 14 which are to transmit signals. The description will be given later of the preamble signal specified in the plurality of kinds. The preamble signal of MIMO system is also defined in such a manner as to contain STSs and LTSs similar to the preamble signal of legacy system shown in FIG. 2. Here, the signal pattern differs between STS and LTS.

The monitoring unit 112 monitors the presence of a communication apparatus which is not compatible with the MIMO system but is compatible with the legacy system. Here, assume that the transmitting apparatus 10 and a receiving apparatus, not shown, constitute integrally a communication apparatus, for example, a base station apparatus corresponding to the MIMO system. Among the received signals, the receiving apparatus searches for signals received from a communication apparatus of legacy system. That is, it is determined whether or not the packet format of a received packet format corresponds to the packet format of legacy system shown in FIG. 2. If the monitoring unit 112 has not detected any packet signal defined in the legacy system over a predetermined period of time, it is judged that the communication apparatus associated with the legacy system does not exist. If, on the other hand, the monitoring unit 112 has detected any packet signal defined in the legacy system over a predetermined period of time, it is judged that the communication apparatus associated with the legacy system exists.

The channel characteristics acquiring unit 114 derives the characteristics of a radio channel between the transmitting apparatus 10 and a receiving apparatus 12. The characteristics of a radio channel are measured by a predetermined method. One method is such that the characteristics of a radio channel are measured by the receiving apparatus 12 of FIG. 3. And another method is such that they are measured by a communication apparatus including the transmitting apparatus 10. The former corresponds to the characteristics of a radio channel from the transmitting apparatus 10 toward the receiving apparatus 12 whereas the latter corresponds to the characteristics of a radio channel from the receiving apparatus 12 toward the transmitting apparatus 10. In the former case, it is assumed that the communication apparatus including the receiving apparatus 12 conveys the measurement result to the communication apparatus including the transmitting apparatus 10. Here, it is assumed that the characteristics of a radio channel include received power, delay profile, delay spread, error rate and so forth.

Figure 6A:
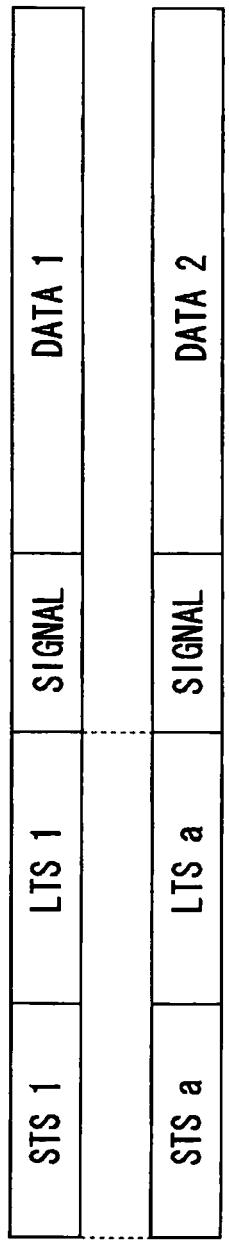
FIGS. 6A and 6B illustrate packet formats selected by the selector shown in FIG. 5.
Figure 6B:
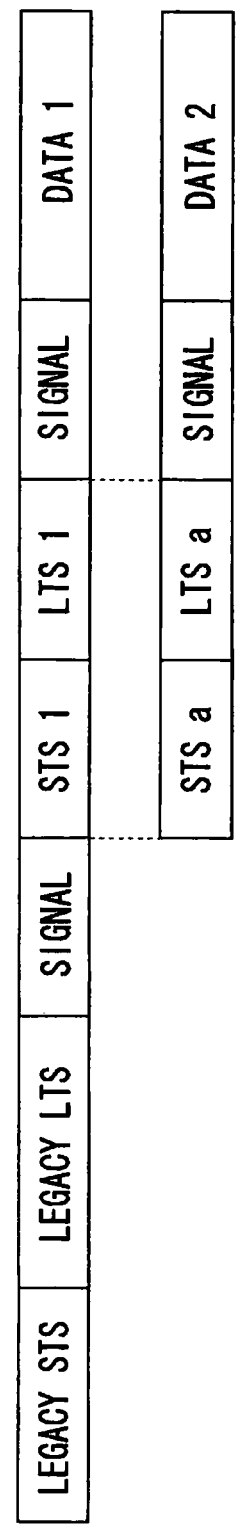

The selector 110 selects a packet format based on the monitoring result obtained by the monitoring unit 112. Here, the packet format is defined in two kinds. FIGS. 6A and 6B illustrate packet formats selected by the selector 110. FIG. 6A shows a packet format in which a preamble signal compatible with a MIMO system is placed in the front portion thereof (hereinafter this packet format will be referred to as "dedicated format"). Here, assume that signals are transmitted from the first transmitting antennas 14a and the second transmitting antennas 14b from among the transmitting antennas 14 and the packet format of a signal transmitted from the first transmitting antenna 14a is shown in the upper section of FIG. 6A and the packet format thereof transmitted from the second transmitting antenna 14b is shown in the lower section of FIG. 6A. "STS1" and "LTS1" are transmitted as preamble signals from the first transmitting antenna 14a, and "STSa" and "LTSa" are transmitted as preamble signals from the second transmitting antenna 14b. Here, "STS1" and STSa" as well as "LTS1" and "LTSa" are signals different from each other, respectively, and the detail thereof will be described later.

FIG. 6B shows a packet format in which a preamble signal compatible with the legacy system is further placed before the preamble signal compatible with the MIMO system (hereinafter this packet format will be referred to as "mixed format"). Here, the preamble signals STS and LTS compatible with the legacy system will be denoted as "legacy STS" and "legacy LTS", respectively. The patterns of the legacy STS are as described earlier with reference to FIG. 2. A portion corresponding to the preamble signals of the MIMO system is the same as that shown in FIG. 6A. "Signal" is placed between the preamble signals compatible with the legacy system and those compatible with the MIMO system. The "signal" contains information indicating that the preamble signals compatible with the MIMO system are assigned. Thus, even if the communication apparatus of a legacy system receives this packet, it may discard this packet signal from the content of the "signal". The information indicating such the preamble signals are assigned may be the length of a packet signal. In other words, it suffices if whether a certain signal continues for a certain length of time or not can be decided.

Since the dedicated format has less redundant signal component, the packet utilization efficiency can be improved. On the other hand, the packet signal compatible with the legacy system is added in the mixed format, so that the mixed format is detected by a communication system compatible with the legacy system. If the monitoring unit 112 has not detected any communication apparatus compatible with the legacy system, the selector 110 selects the dedicated format. And if the monitoring unit 112 has detected the communication apparatus compatible with the legacy system, the selector 110 selects the mixed format.

Figure 7A:
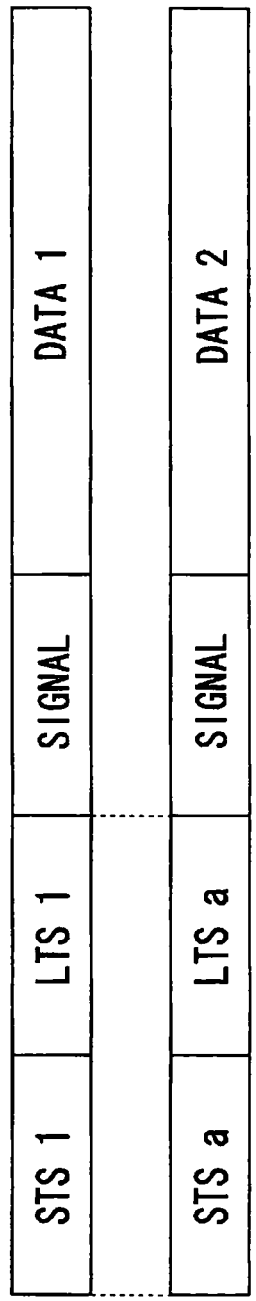
FIGS. 7A and 7B illustrate formats of LTS selected by the selector shown in FIG. 5.
Figure 7B:
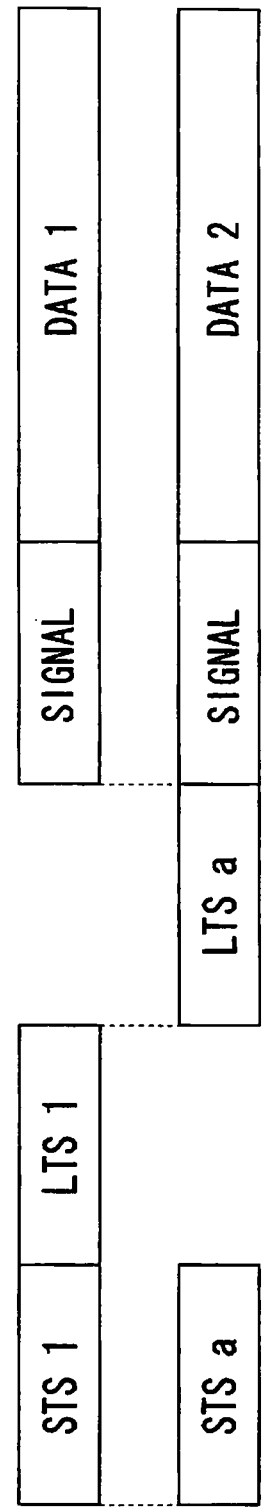

The selector 110 selects the allocation of LTS, based on the characteristics of a radio channel detected by the channel characteristics acquiring unit 114. FIGS. 7A and 7B illustrate the format of LTS selected by the selector 110. Though in FIGS. 7A and 7B the format is described using the dedicated format only, the format used may be the mixed format. In that case when the mixed format is used, the preamble signals of the MIMO system will be shown instead. FIG. 7A shows a case when LTSs are respectively transmitted at the same timing (hereinafter such a format will be referred to as "contiguous format"). "LTS1" is transmitted from the first transmitting antenna 14a and "LTSa" is transmitted from the second transmitting antenna 14b. FIG. 7B shows a case when LTSs are respectively transmitted from a plurality of antennas 14 at different timings (hereinafter such a format will be referred to as "separate format"). As shown in FIG. 7B, the timing at which "LTS1" is transmitted deviates from the timing at which "LTSa" is transmitted.

Since the contiguous format has less redundant signal component, the packet utilization efficiency can be improved. On the other hand, the separate format is such that "LTS1" and "LTSa" are transmitted at different timings and the intersignal interference is reduced. Thus, the estimation of channel characteristics as well as the estimation of response vectors and weight vectors by the receiving apparatus 12, described later, will be accurately done, so that the communication quality improves. If the characteristic of a radio channel acquired by the channel characteristics acquiring unit 114, for example, the error rate has not deteriorated more than a threshold value, then the selector 110 selects the contiguous format. And if the error rate has more deteriorated than the threshold value, the selector 110 selects the separate format.

FIG. 8 is a table showing a relationship, used when the selection is done at the selector 110, between the number of transmitting antennas 14 and the patterns of STSs transmitted by the transmitting antennas. Though the description concerning LTSs is omitted here, the selection will be done in the same manner as with STSs. The table shows the numbers of transmitting antennas 14 vertically. The table also shows horizontally the transmitting antennas 14 to be used and the STSs corresponding thereto in relation to the numbers of antennas 14. In other words, when the number of transmitting antennas 14 is "1", a legacy STS is transmitted from the first transmitting antenna 14a. If the number of transmitting antennas 14 becomes one when using the dedicated format, the selector 110 may transmit "STS1" defined in the MIMO system. As a result of this, the switching otherwise done to the preamble signal compatible with the legacy system can be skipped.

When the number of transmitting antennas 14 is "2", "STS1" is transmitted from the first transmitting antenna 14a and "STSa" is transmitted from the second transmitting antenna 14b. When the number of transmitting antennas 14 is "3", "STS1" is transmitted from the first transmitting antenna 14a, "STS2" is transmitted from the second transmitting antenna 14b and "STSb" is transmitted from the third transmitting antenna 14c. Here, in order to solve the aforementioned problem, "STS1", "STSa", "STS2" and "STSb" are defined in a manner such that the cross-correlation values thereof become small.

The transmitting apparatus further includes a function by which to notify the receiving apparatus 12 about the number of transmitting antennas 14 that are transmitting the signals, by the pattern difference between "STSa" transmitted from the second transmitting antenna 14b when the number of antennas 14 is "2" and "STSb" transmitted from the transmitting antenna 14c when the number of transmitting antennas 14 is "3". As a result, these STSs differ to the degree that "STSa" and "STSb" are identifiable from the signals received by the receiving apparatus 12. In other words, the value of cross-correlation between "STSa" and "STSb" is so defined as to be small.

The number of transmitting antennas 14 is determined by the control unit 26. The control unit 26 determines the number of transmitting antennas 14 in accordance with the characteristics of a radio channel acquired by the channel characteristics acquiring unit 114. That is, if the characteristics of a radio channel are found favorable, the number of transmitting antennas 14 is increased. The control unit 26 may determine the number of transmitting antennas 14 based on the information capacity to be transmitted. For instance, if the information capacity to be transmitted is large, the number of transmitting antenna 14 is increased.

Figure 9:
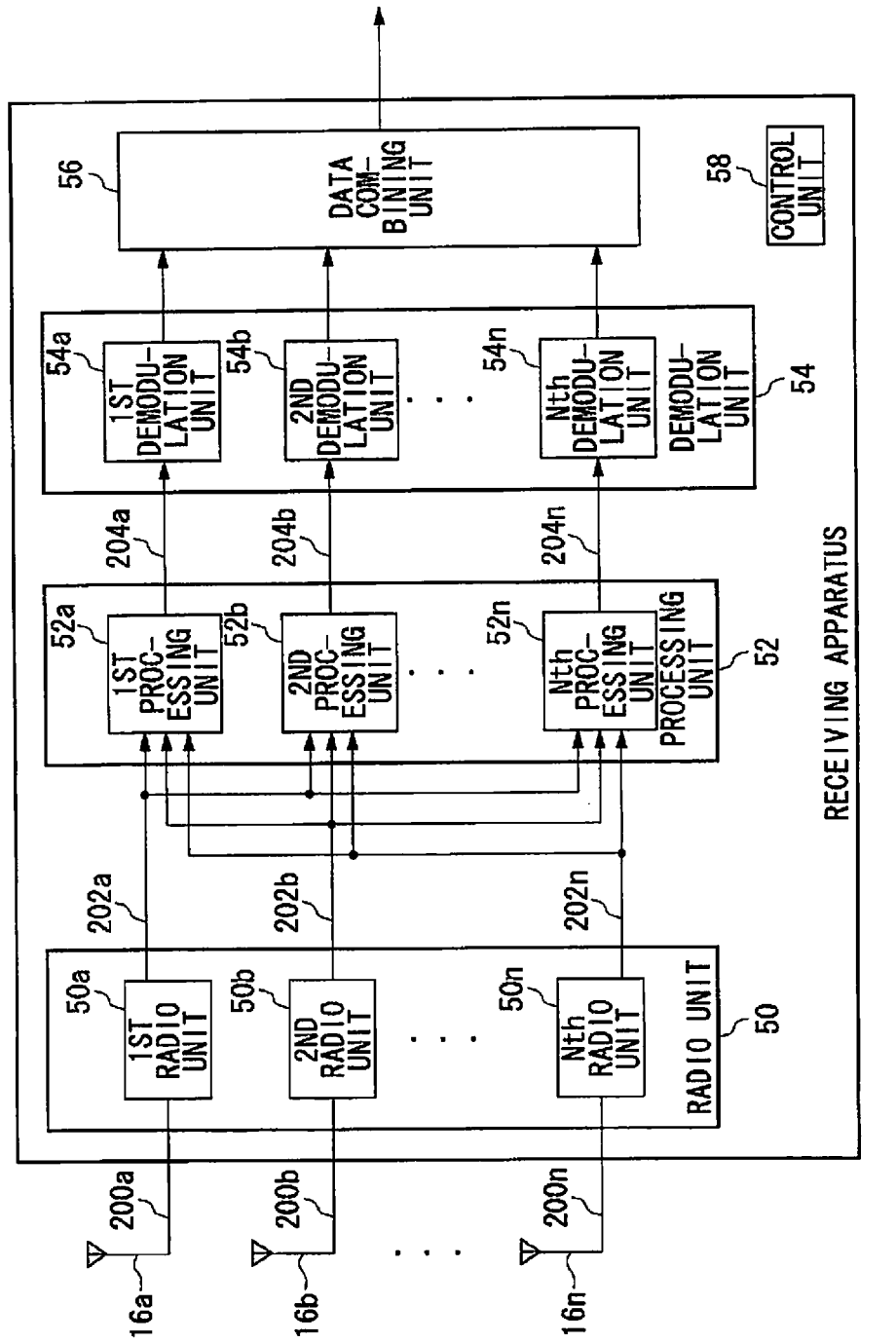
FIG. 9 illustrates a structure of the receiving apparatus shown in FIG. 3.

FIG. 9 illustrates a structure of a receiving apparatus 12. The receiving apparatus 12 includes a first receiving antenna 16a, a second receiving antenna 16b, ... and an Nth receiving antenna 16n, which are generically referred to as receiving antennas 16, a first radio unit 50a, a second radio unit 50b, ... and an Nth radio unit 50n, which are generically referred to as radio units 50, a first processing unit 52a, a second processing unit 52b, ... and an Nth processing unit 52n, which are generically referred to as processing units 52, a first demodulation unit 54a, a second demodulation unit 54b, ... and an Nth demodulation unit 54n, which are generically referred to as demodulation units 54, a data combining unit 56, and a control unit 58. Signals used include a first radio received signal 200a, a second radio received signal 200b, ... and an Nth radio received signal 200n, which are generically referred to as radio received signals 200, a first baseband received signal 202a, a second baseband received signal 202b, ... and an Nth baseband received signal 202n, which are generically referred to as baseband received signals 202, and a first composite signal 204a, a second composite signal 204b, ... and an Nth composite signal 204n, which are generically referred to as composite signals 204.

The radio units 50 carry out frequency conversion processing between radio received signals 200 of radio frequency and baseband received signals 202 of baseband, amplification processing, A-D conversion processing and the like. It is assumed here that the radio frequency of the radio received signals 200 is in the 5 GHz band. The radio units 50 further perform correlation processing for timing detection. The processing units 52 perform adaptive array signal processing on the baseband received signals 202 and output composite signals 204 corresponding to a plurality of transmitted signals. The demodulation units 54 demodulate the composite signals 204. The demodulation units 54 further perform the removal of guard intervals, FFT, deinterleave and decoding. The data combining unit 56 combines the signals outputted respectively from the demodulation units 54 in correspondence to the data separating unit 20 as shown in FIG. 4. The control unit 58 controls the timing and other functions of the receiving apparatus 12.

Figure 10:
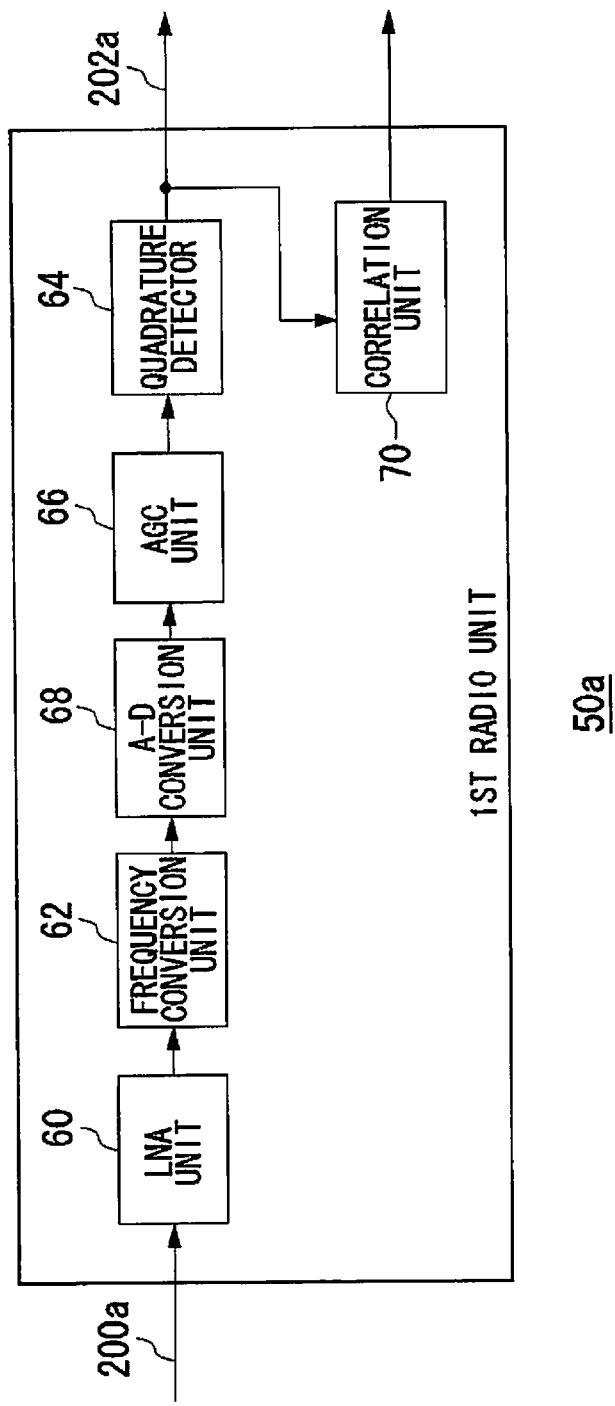
FIG. 10 illustrates a structure of the first radio unit shown in FIG. 9.

FIG. 10 illustrates a structure of a first radio unit 50a. The first radio unit 50a includes an LNA 60, a frequency conversion unit 62, a quadrature detector 64, an AGC unit 66, an A-D conversion unit 68 and a correlator 70.

The LNA 60 amplifies a first radio received signal 200a. The frequency conversion unit 62 carries out a frequency conversion between a radio frequency in the 5 GHz band and an intermediate frequency for a signal to be processed. The AGC unit 66 controls gain automatically so as to turn the amplitude of a signal into an amplitude within the dynamic range of the A-D conversion unit 68. It is to be noted that, in the initial setting of the AGC unit 66, the STS in a received signal is used and control is performed in a manner such that the strength of the STS approaches a prescribed value. The A-D conversion unit 68 converts an analog signal into a digital signal. The quadrature detector 64 performs a quadrature detection of an intermediate-frequency signal and generates a baseband digital signal so as to output it as a first baseband received signal 202a. The baseband signal, which is generally composed of in-phase components and quadrature components, shall be represented by two signal lines. For the sake of clarity in the figure, the baseband signal is presented here by a single signal line, and the same will be applied hereinafter.

In order to detect an STS from the first baseband received signal 202a, the correlator 70 performs a correlation processing on a first baseband received signal 202a and an STS stored in advance and outputs a correlation value. In the MIMO system the STS is set for each of the transmitting antennas 14, so that the correlators 70 perform correlation processing respectively for a plurality of STSs and output a plurality of correlation values. The correlation values are inputted to the control unit 58 shown in FIG. 9 via signal lines not shown. The control unit 58 determines the start of receiving a packet signal based on the plurality of correlation values inputted from the plurality of correlators 70 and sends the decision to the processing units 52, the demodulation units 54 and others. Also, in order to demodulate a plurality of signals, the control unit 58 determines the assignment of processing units 52 and demodulation units 54 for the respective signals and sends the decision to the processing units 52 and the demodulation units 54.

Figure 11:
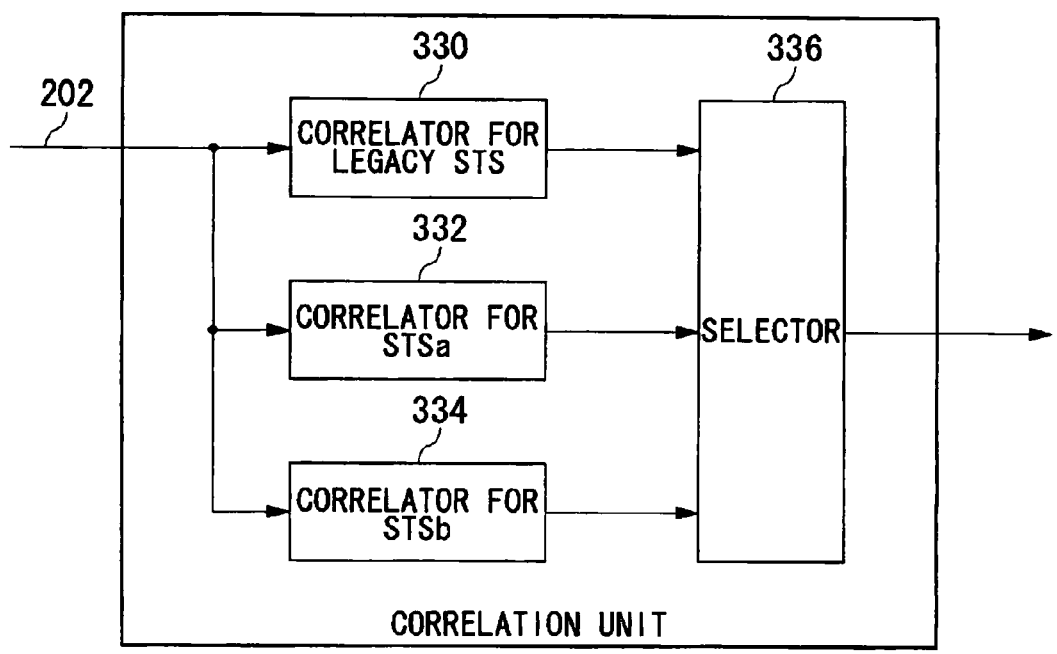
FIG. 11 illustrates a structure of the correlator shown in FIG. 10.

FIG. 11 illustrates a structure of a correlator 70. The correlator 70 includes a correlator for legacy STS 330, a correlator for STSa 332, a correlator for STSb 334 and a selector 336.

The correlator for STSa 332, which stores beforehand signal series where STSa has been converted to signal series in the time domain, calculates a value of correlation between the stored signal series and the received signal series (hereinafter referred to as "correlation value for 2 antennas"). The correlator for STSb 334, which stores beforehand signal series where STSb has been converted into signal series in the time domain, calculates a value of correlation between the stored signal series and the received signal series (hereinafter referred to as "correlation value for 3 antennas").

The correlator for legacy STS 330 stores in advance the signal series where the aforementioned legacy STS has been converted into the time domain or where subcarrier signals for part of the legacy STS have been converted into the time domain. The correlator for legacy STS 330 calculates a value of correlation between the stored signal series and the received signal series (hereinafter referred to as "correlation value for 1 antenna"). The signal series stored in the correlator for legacy STS 330 may be those corresponding to the STS compatible with the MIMO system, for instance, STS1 shown in FIG. 8.

The selector 336 compares a correlation value for 2 antennas, a correlation value for 3 antennas and a correlation value for 1 antenna and selects a largest correlation value therefrom. An estimation unit, which is not shown here, determines the number of transmitting antennas 14 transmitting data, based on the selected correlation value. That is, if the correlation value for 2 antennas is the largest, the number of transmitting antennas 14 will be determined to be "2". And if the correlation value for 3 antennas is the largest, the number of transmitting antennas 14 will be determined to be "3". And if the correlation value for 1 antenna is the largest, the number of transmitting antennas 14 will be determined to be "1".

Figure 12:
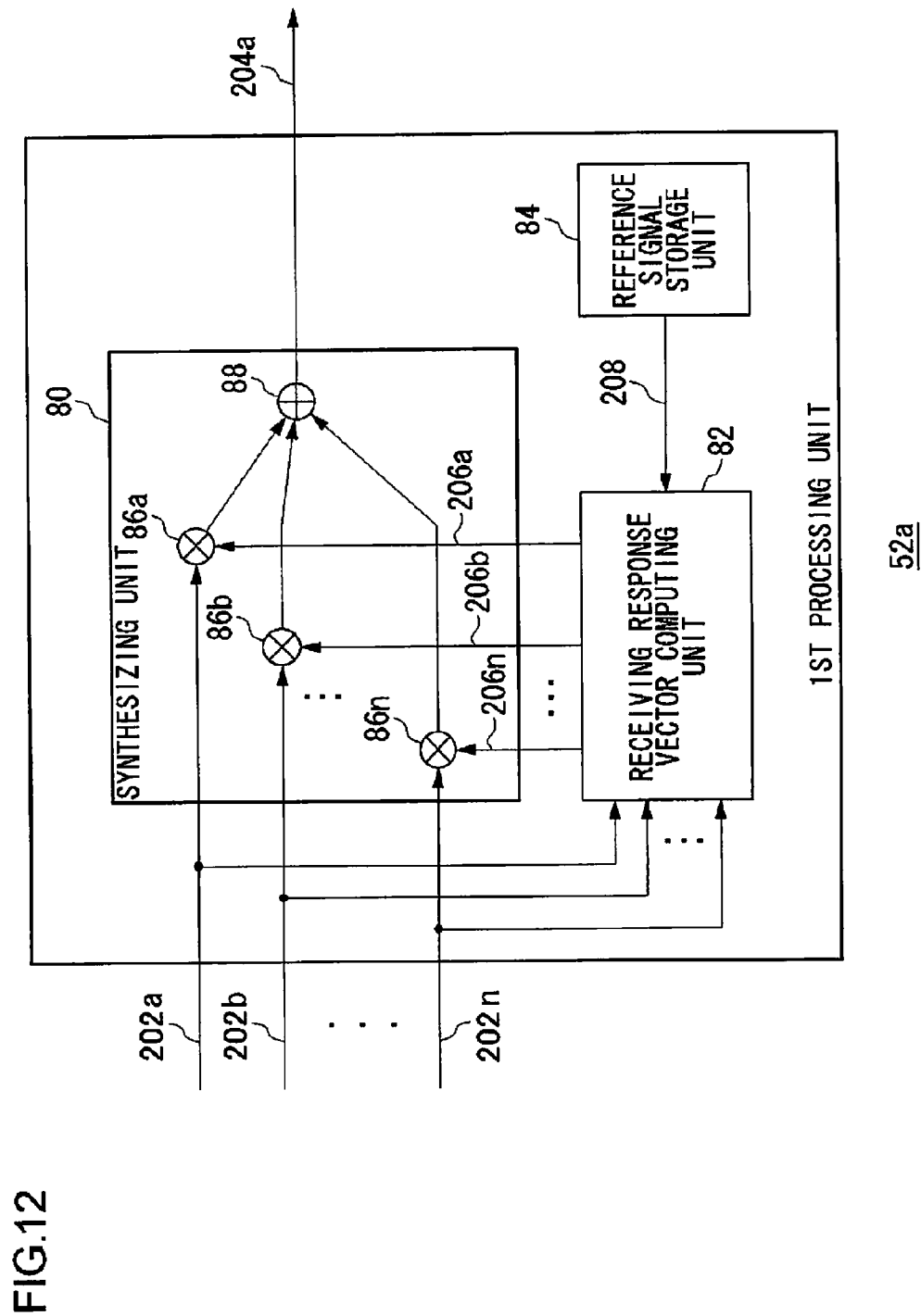
FIG. 12 illustrates a structure of the first processing unit shown in FIG. 9.

FIG. 12 illustrates a structure of a first processing unit 52a. The first processing unit 52a includes a synthesizing unit 80, a received response vector computing unit 82 and a reference signal storage unit 84. The synthesizing unit 80 includes a first multiplier 86a, a second multiplier 86b, ... and an Nth multiplier 86n, which are generically referred to as multipliers 86, and an adder 88. Also, signals used include a first received weight signal 206a, a second received weight signal 206b, . . . and an Nth received weight signal 206n, which are generically referred to as received weight signals 206, and a reference signal 208.

The reference signal storage unit 84 stores LTSs and other signals. It is assumed herein that LTS is also selected in accordance with STS selected by the correlator for legacy STS 330.

The received response vector computing unit 82 computes received weight signals 206, as receiving response characteristics of received signals for transmitted signals, from baseband received signals 202 and reference signal 208. Although the method for computing the received weight signals 206 may be arbitrary, one example, as shown below, is based on a correlation processing. It is to be noted that the received weight signals 206 and the reference signal 208 are inputted not only from within the first processing unit 52a but also from the second processing unit 52b or the like via signal lines not shown. If the first baseband received signal 202a is denoted by $x_1(t)$, a second baseband received signal 202b by $x_2(t)$, the reference signal 208 corresponding to the first transmitting antenna 14a by $S_1(t)$ and the reference signal 208 corresponding to the second transmitting antenna 14b by $S_2(t)$, then $x_1(t)$ and $x_2(t)$ will be expressed by the following Equation (5):

$$x_1(t) = h_{11}S_1(t) + h_{21}S_2(t)$$

$$x_2(t) = h_{12}S_1(t) + h_{22}S_2(t) \quad (5)$$

The noise is ignored here. A first correlation matrix $R_1$, with E as an ensemble average, is expressed by the following Equation (6):

$$R_1 = \begin{bmatrix} E[x_1 S_1^*] & E[x_1 S_2^*] \\ E[x_2 S_1^*] & E[x_2 S_2^*] \end{bmatrix} \quad (6)$$

A second correlation matrix $R_2$ for computing the correlation among the reference signals 208 is given by the following Equation (7):

$$R_2 = \begin{bmatrix} E[S_1 S_1^*] & E[S_1 S_2^*] \\ E[S_2 S_1^*] & E[S_2 S_2^*] \end{bmatrix} \quad (7)$$

Finally, the first correlation matrix $R_1$ is multiplied by the inverse matrix of the second correlation matrix $R_2$ so as to obtain a received response vector 206, which is expressed by the following Equation (8):

$$\begin{bmatrix} h_{11} & h_{21} \\ h_{12} & h_{22} \end{bmatrix} = R_1 R_2^{-1} \quad (8)$$

The received weight signals 206 may be derived using an adaptive algorithm such as the LMS.

The multipliers 86 weight the baseband received signals 202 with the received weight signals 206 respectively, and the adder 88 adds up the outputs of the multipliers 86 so as to output the composite signal 204.

Figure 13:
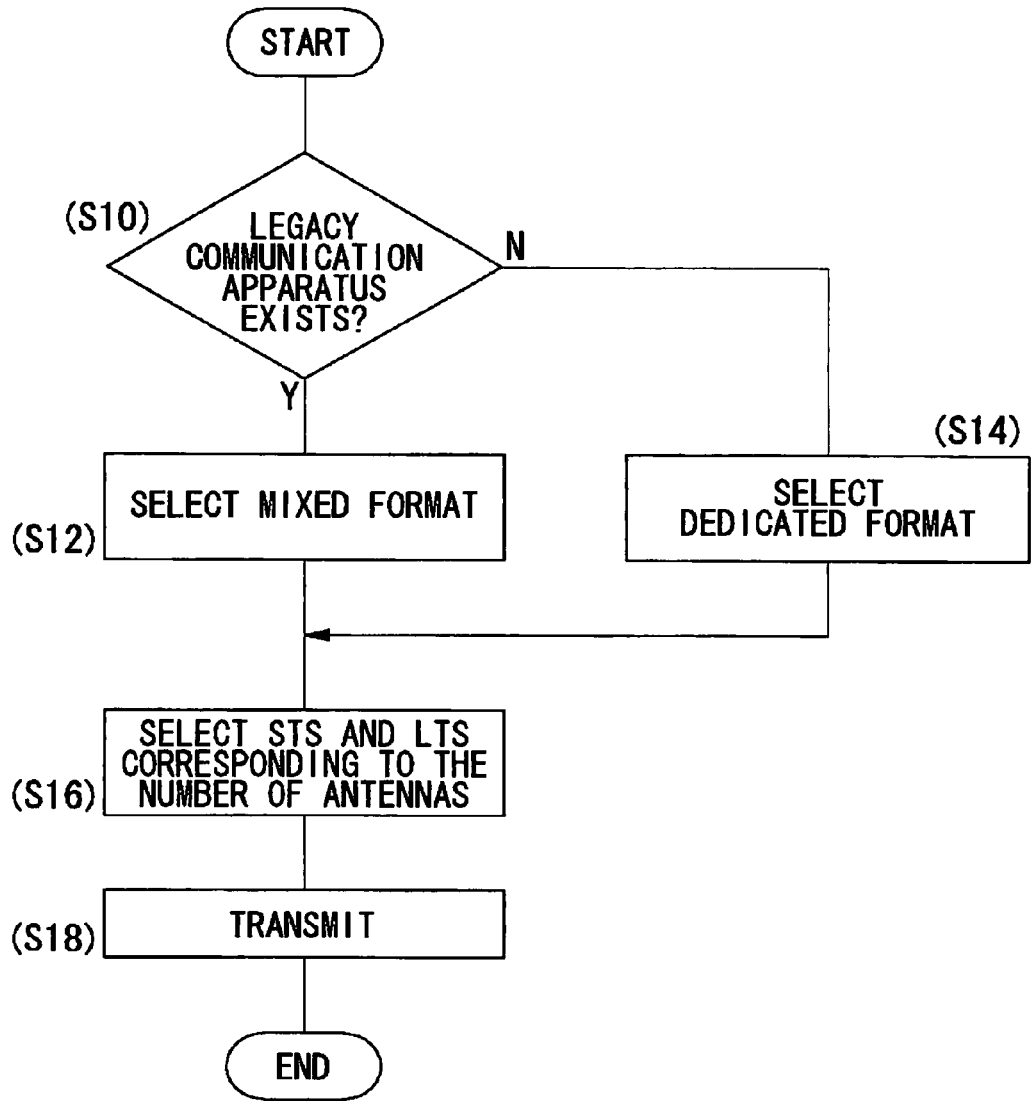
FIG. 13 is a flowchart showing a procedure for transmission processing in the transmitting apparatus shown in FIG. 3.

FIG. 13 is a flowchart showing a procedure for transmission processing in a transmitting apparatus 10. The monitoring unit 112 monitors whether there exists any communication apparatus compatible with the legacy system or not. If the communication apparatus compatible with a legacy system exits (Y of S10), the selector 110 selects the mixed format (S12). If, on the other hand, the communication apparatus compatible with a legacy system does not exist (N of S10), the selector 110 selects the dedicated format (S14). Furthermore, the selector 110 selects, from the storage unit 116, STS and LTS corresponding to the number of transmitting antennas 14 (S16) and assigns them within the selected format. And the transmitting apparatus 10 transmits the packet signals (S18).

Figure 14:
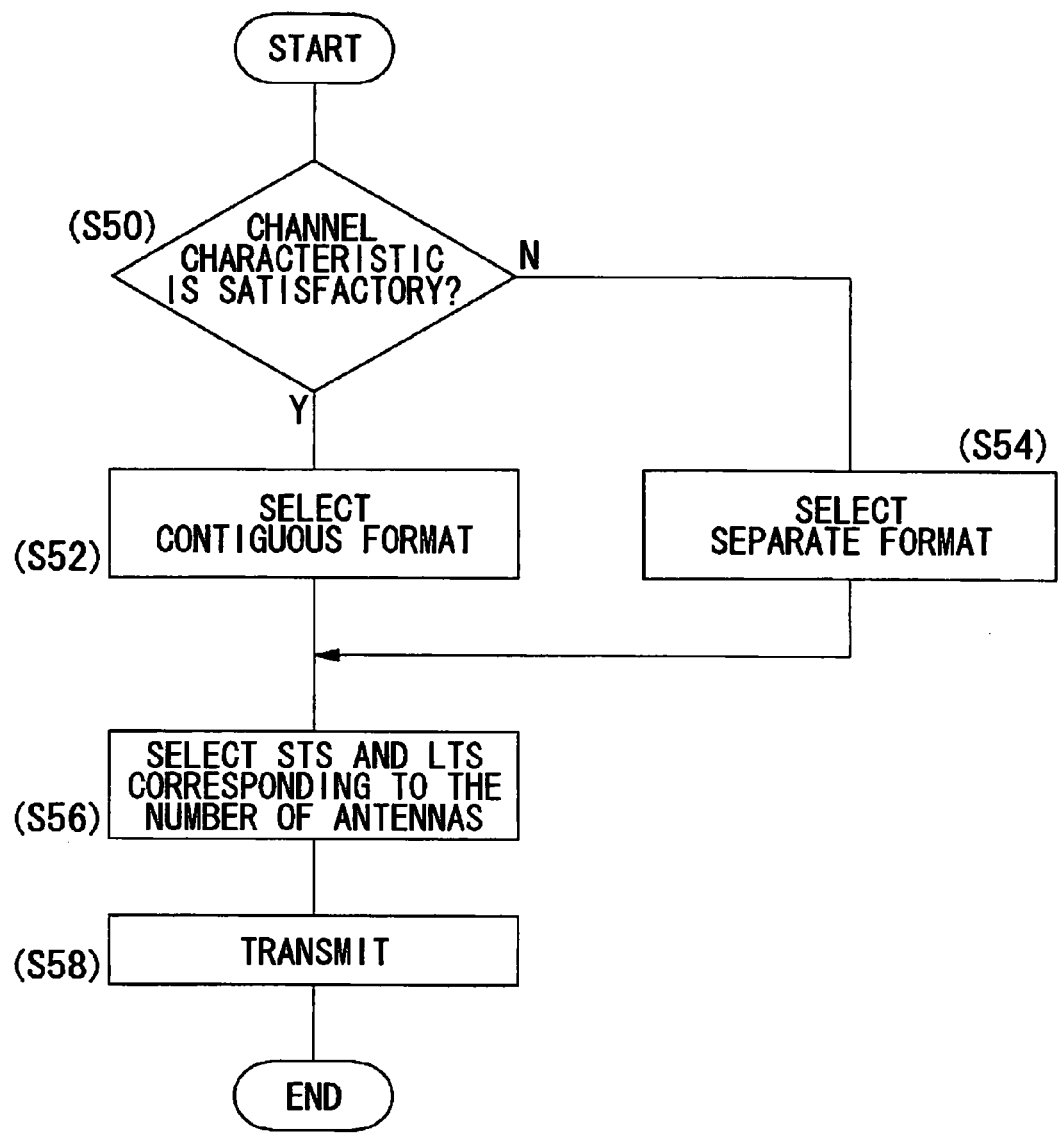
FIG. 14 is another flowchart showing a procedure for transmission processing in the transmitting apparatus shown in FIG. 3.

FIG. 14 is a flowchart showing another procedure for transmission processing in the transmitting apparatus 10. The channel characteristics acquiring unit 114 acquires the characteristics of a radio channel, for example, the error rate. If the characteristic of a radio channel is satisfactory (Y of S50), that is, if the error rate is smaller than a threshold value, then the selector 110 selects the contiguous format (S52). If, on the other hand, the characteristic of a radio channel is not satisfactory (N of S50), the selector 110 selects the separate format (S54). Furthermore, the selector 110 selects, from the storage unit 116, STS and LTS corresponding to the number of transmitting antennas 14 (S56) and assigns them within the selected format. And the transmitting apparatus 10 transmits the packet signals (S58).

According to the present embodiment, the preamble signal in the legacy system is added to the front portion of a packet signal, so that the packet signal can be received by a communication apparatus compatible with the legacy system. The compatibility with the legacy system can be retained. The presence of packet signal can be made known to the communication apparatus of a legacy system. Since the transmission of signals by the communication apparatus of a legacy system is prevented, the probability of signal collision can be lowered. Since the presence or absence of the preamble signal of the legacy system is switched, the improvement in the compatibility with the legacy system and the packet utilization efficiency can be selected. The switching between the presence and the absence of a preamble signal of the legacy system is done based on whether any legacy system exits or not, thereby giving no adverse effect on other communication apparatus.

Furthermore, the pattern of preamble signal is changed in accordance with the number of antennas, so that the communication quality can be improved. Even when the number of antennas becomes one, the preamble signal corresponding to a single one of a plurality of antennas is used, thus eliminating the trouble of switching to the legacy system. A signal is inserted after the preamble signal of a legacy system. Thus, the content of such a subsequent signal can be conveyed to a communication apparatus of the legacy system. The structure of preamble signals to be transmitted from a plurality of antennas is changed, so that selection can be made as to the transmission quality of signals and the packet utilization efficiency. The structure of preamble signals to be transmitted from a plurality of antennas is varied based on the quality of a radio channel, so that the structure of a preamble suitable for the radio channel can be selected.

The present invention has been described based on the embodiments which are only exemplary. It is understood by those skilled in the art that there exist other various modifications to the combination of each component and process described above and that such modifications are encompassed by the scope of the present invention.

In the above embodiments, the wireless LAN that conforms to the IEEE802.11a standard is used as an example of the legacy system, but is not limited thereto and other communication systems may also be used. Though in the above embodiments the communication system 100 is illustrated as a MIMO system, but it is not limited thereto and other communication systems may be used. The multi-carrier signal may not be transmitted. The present embodiments can be applied to various types of communication systems 100. That is, it is preferable that the legacy system and the communication system 100 have some sort of compatibility such as the identical radio frequency.

Although the present invention has been described by way of exemplary embodiments and modifications, it should be understood that many other changes and substitutions may further be made by those skilled in the art without departing from the scope of the present invention which is defined by the appended claims.

What is claimed is:

1. A receiving apparatus comprising:
a receiving module configured for receiving one of a first and second packet signals
wherein
(1) the first packet signal has a first packet format which includes a first short training sequence (STS) for a MIMO system and a first long training sequence (LTS) for the MIMO system, the first STS and the first LTS being arranged in that order in the first packet format, and
(2) the second packet signal has a second packet format which includes a second STS for a non-MIMO system, a second LTS for the non-MIMO system, and a third LTS for the MIMO system, the second STS, the second LTS, and the third LTS being arranged in that order in the second packet format,
and wherein
the first packet format includes no second LTS,
the first and second STSs are for AGC estimation,
the first to third LTSs are for channel estimation,
the first LTS has a signal pattern which is the same as that of the third LTS, and
the first STS has a signal pattern which is different from that of the second STS,
said receiving apparatus further comprising a processing unit configured for processing one of the first and second packet signals, said processing unit including:
an ACG module configured for performing AGC estimation based on said first STS or on said second STS,
a channel estimation module configured for performing channel estimation based on said first LTS or on said second and third LTSs.

* * * * *